UNITED STATES PATENT OFFICE.

PARKER J. NOYES, OF LANCASTER, NEW HAMPSHIRE.

PILL OR TABLET.

SPECIFICATION forming part of Letters Patent No. 536,155, dated March 19, 1895.

Application filed May 5, 1894. Serial No. 510,193. (No specimens.)

*To all whom it may concern:*

Be it known that I, PARKER J. NOYES, a citizen of the United States, residing at Lancaster, in the county of Coos and State of New Hampshire, have invented certain new and useful Improvements in Pills or Tablets; and I do declare the following to be a full, clear, and exact description of the invention, such as will enable others skilled in the art to which it appertains to make and use the same.

My invention relates to an improved form of soluble pill or tablet, and especially those provided with a coating of sugar or similar material.

My object is to produce a pill, tablet or medicament with a coating or envelope which will be more rapidly and easily dissolved upon coming in contact with the juices of the stomach. To accomplish this purpose I incorporate with the sugar or other suitable material which comprises the coating or envelope, an effervescing compound or mixture consisting of a suitable carbonated alkali or its equivalent.

The preferred composition which I use for carrying out the foregoing purpose consists of the following elements: sodium bicarbonate, nine parts; citric acid, seven parts; cane sugar, ninety-six parts. These ingredients are mixed in any suitable manner, but inasmuch as the exact proportions, or any particular alkaline carbonate or vegetable acid, are not necessary they may be varied to suit the exigencies of the occasion. It is, however, desirable that the ingredients employed should be mixed in a dry state and then put on the pill or tablet by compression or other suitable means.

It will be apparent from the foregoing description that a coating of this character is exceedingly susceptible to moisture, and will be at once dissolved by the juices of the stomach upon swallowing, thereby permitting the medicament to act without delay.

What I claim as new, and desire to secure by Letters Patent, is—

1. A pill or tablet provided with a coating of effervescing material.

2. A pill or tablet having a non-effervescing body provided with an effervescent coating.

In witness whereof I affix my signature in presence of two witnesses.

PARKER J. NOYES.

Witnesses:
M. A. HASTINGS,
H. D. F. HILLIARD.